July 8, 1958
A. JEHIER
2,842,649
MACHINE FOR WELDING PLASTIC SHEET MATERIALS
Filed Jan. 16, 1957
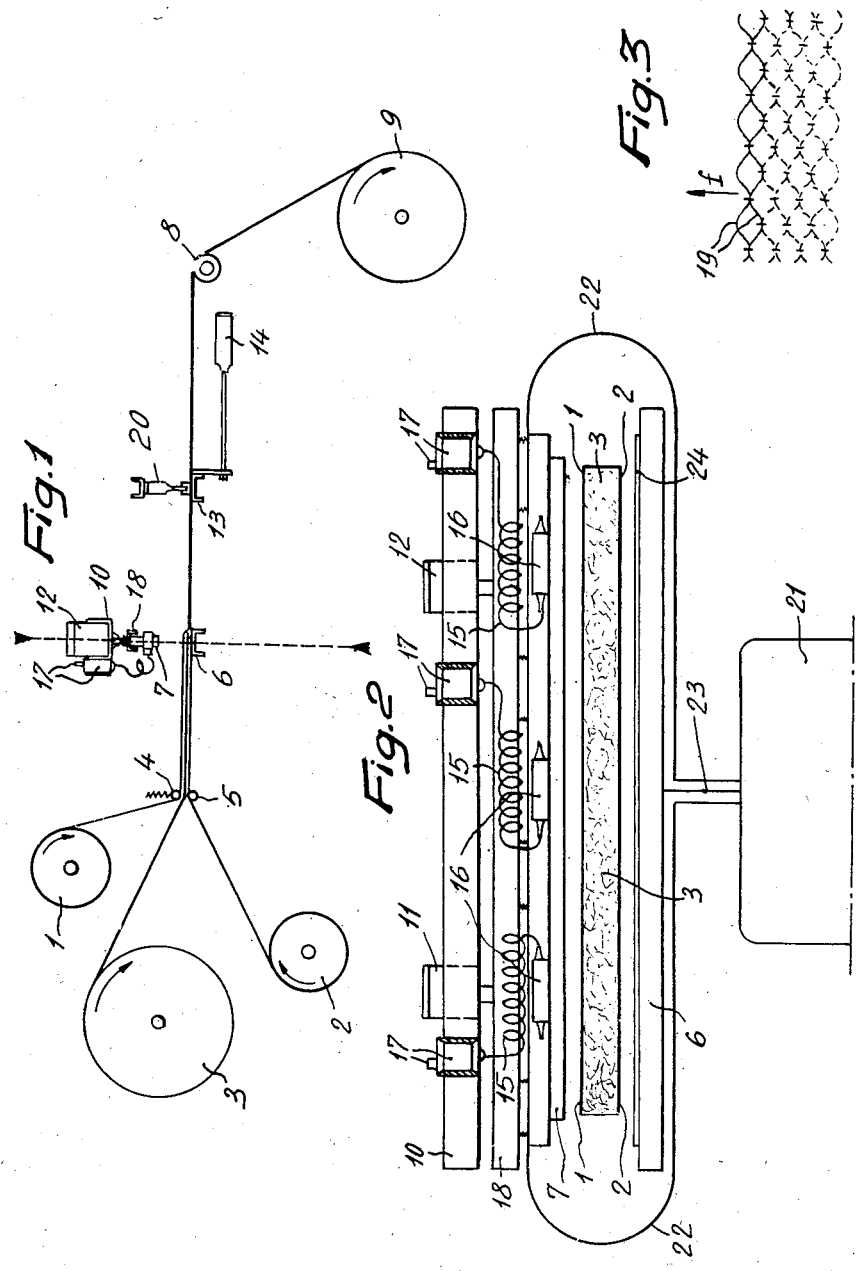
INVENTOR
ANDRE JEHIER
BY
Cameron, Kerkam & Sutton
ATTORNEYS

United States Patent Office 2,842,649
Patented July 8, 1958

2,842,649

MACHINE FOR WELDING PLASTIC SHEET MATERIALS

André Jehier, Chemillé, France

Application January 16, 1957, Serial No. 634,568

4 Claims. (Cl. 219—10.47)

This invention concerns a machine for welding plastic sheet materials, more particularly to such a machine for welding continuous sheets of plastic material together along predetermined lines.

The object of the invention is to provide a machine which enables transverse lines to be rapidly and accurately made on continuous sheets of plastic material of great length, and in particular on structures made up of two superimposed sheets of plastic material enclosing a plastic filling material intended, among other things, for the manufacture of bedspreads.

In order to give such bedspreads of plastic material an appearance similar to that of quilted or stitched bedspreads of textile materials, it has already been proposed to simulate the stitched seams by welding the two outer sheets, and even the inside filling material, together along lines which form an ornamental pattern. These lines may be transverse and have an undulating configuration so that the undulations of successive lines are tangential in relation to one another and form a continuous network which extends over the whole surface of the article.

The making of such welded lines to produce the desired effect presents difficulties, as it has not hitherto been possible to effect a uniform softening of the plastic material over the whole length of each welding line, owing to slight variations in thickness of the padding and distortion of the electrode and counter-electrode under the influence of the pressure and heat.

The present invention provides a machine which enables seams having the desired appearance to be made.

According to the present invention, a machine for welding continuous sheets of plastic material together along predetermined lines, comprises means which cause superimposed sheets of plastic material which are to be welded to pass between two electrodes for welding by means of high frequency currents, one at least of these electrodes including permanent heating means suitable for maintaining it at a temperature only slightly below the fusion temperature of the plastic material.

With such an arrangement, the passage of the high-frequency currents is uniform over the length of the electrode. In addition, the fusion temperature of the plastic material is reached practically as soon as the electrodes come into contact with the sheet material in order to weld it, due to the action of the additional heat provided by the high-frequency currents.

The permanent heating means of the/or each electrode may be comprised by several electrical resistances distributed over the whole length of the said electrode each resistance being controlled by a separate thermostat influenced by the temperature pertaining in the vicinity of the resistance which it controls, thereby enabling a perfectly even temperature to be obtained over the whole length of the electrode.

Furthermore, at least one of the electrodes may be covered with a dielectric material, and the lower electrode can be covered with a sheet of flexible material, possibly coated with a dielectrical material.

The invention will now be further described by way of example with reference to the accompanying diagrammatic drawings, in which:

Fig. 1 is a side view of a machine according to the invention for welding together sheets of plastic material;

Fig. 2 is a corresponding front view;

Fig. 3 illustrates an example of the form of the welding seams which can be produced with this machine.

Referring to the drawings, thermoplastic packing, stuffing or padding is fed from a roll 3, between upper and lower layers of thermoplastic sheeting fed from rolls 1 and 2 respectively, into the machine. The stuffing sandwiched between the thermoplastic material, passes between two admission cylinders 4 and 5, over a lower or counter-electrode 6, above which an upper electrode 7 is arranged, and eventually passes over an outgoing roller 8, after which all three layers of material are rolled up on a drum 9.

The lower or counter-electrode 6 is fixed, while the upper electrode 7, mounted in an electrode holer 18, is movable in a vertical plane under the action of two pistons within compressed air cylinders 11 and 12 carried by a crossbar 10. This arrangement enables an even pressure between the electrode 7 on the counter-electrode 6 to be obtained.

The feed of the superimposed sheets to be welded is effected in a discontinuous manner while the electrode 7 is raised by the action of an advancing arrangement comprising a slide block 13 connected with a piston movable horizontally in a compressed air cylinder 14. The slide block 13 is held tight onto the plastic material by a compressed air piston 20.

The upper electrode 7 is provided with permanent heating means consisting of a plurality (three in the example shown) of electrical resistances 15 distributed over the length of the electrode.

With each resistance 15 is associated an element 16 which is sensitive to temperature and which is placed in the vicinity of the corresponding resistance. Each element 16 is connected to an associated thermostat 17 which is clamped in an appropriate position on crossbar 10 and controls the flow of current through each resistance, in order that the temperature of the electrode may be kept perfectly even over the whole of its length. On its lower face, the electrode 7 has a rib or vein in the shape of the welding lines to be made, such as, for example, a double wavy line 19 as shown in Figure 3. The electrode holder 18 is electrically connected to the earth return of a generator of high-frequency current 21 by conductors 22, while the lower or counter-electrode 6 is electrically insulated from earth and is connected to the other terminal of generator 21 by conductor 23.

Finally, the lower or counter-electrode 6 may be covered with a layer 24 of flexible material, or one or other of the electrodes may be covered with a dielectric layer which will take the place of the aforesaid sheet of elastic material 24.

The operation of the machine which has just been described is very simple.

The thermostats are adjusted so that the temperature of the electrode is slightly lower than the fusion temperature of the plastic material to be welded. For example, if the latter melts at 120° C., the thermostats would be adjusted so that the temperature of the electrode was uniformly 105° C.

When the compressed air is turned on in cylinders 12, by means of a manual or an automatic control mechanism, the electrode 7 descends and presses the sheets of plastic material against the counter-electrode 6. The plastic material is instantaneously brought to 105° C. and the high-frequency currents impart to it a quantity of additional heat which at once brings it to the temperature of 120° C., at which it begins to melt. Welding is thereby effected along the lines 19. The electrode 7 rises again and compressed air is now directed into the feeding system 13, 14, 20, and the sheets of plastic material move forward, for instance by an amount equal to the distance apart of the lines 19 at the peaks of their undulations. The electrode 7 moves down again and so on to produce a continuous pattern. In this way there is obtained a network of welding lines which has the appearance of that which can be seen in Figure 3, arrow $f$ indicating the direction of movement of the sheets.

It is to be understood that the invention is not restricted to the particular embodiment just described and represented, but can be modified as desired within the scope of the appended claims. For instance, the counter-electrode may be provided with heating means.

What is claimed as new and desired to be secured by Letters Patent is:

1. A machine for welding continuous sheets of plastic material together along predetermined lines, in which means are provided to cause superimposed sheets of plastic material which are to be welded to pass between two electrodes for welding by means of high-frequency currents, one at least of these electrodes including permanent heating means suitable for maintaining it at a temperature only slightly below the fusion temperature of the plastic material, the permanent heating means of the electrode being comprised by several electrical resistances distributed over the whole length of the said electrode, each resistance being controlled by a separate thermostat influenced by the temperature pertaining in the vicinity of the resistance which it controls, thereby enabling a perfectly even temperature to be obtained over the whole length of the electrode.

2. A machine as claimed in claim 1 in which at least one of the electrodes is covered with a dielectric material.

3. A machine as claimed in claim 1 in which one of the electrodes is covered with a sheet of flexible material.

4. A machine as claimed in claim 1 in which one of the electrodes is covered with a sheet of flexible material coated with a dielectric material.

References Cited in the file of this patent

UNITED STATES PATENTS

| | | |
|---|---|---|
| 2,404,191 | Quayle et al. | July 16, 1946 |
| 2,463,054 | Quayle et al. | Mar. 1, 1949 |
| 2,734,982 | Gillespie et al. | Feb. 14, 1956 |
| 2,747,646 | Lippman | May 29, 1956 |
| 2,757,266 | Manwaring | July 31, 1956 |